United States Patent
Uhlenbruck

(10) Patent No.: US 8,760,152 B2
(45) Date of Patent: Jun. 24, 2014

(54) DEVICE FOR DETECTING THE POSITION OF A GEAR STEP SELECTOR LEVER AND MOTOR VEHICLE EQUIPPED WITH SAME

(75) Inventor: Falk Uhlenbruck, Hohenahr (DE)

(73) Assignee: ECS Engineered Control Systems AG, Gallen (CH)

( * ) Notice: Subject to any disclaimer, the term of this patent is extended or adjusted under 35 U.S.C. 154(b) by 178 days.

(21) Appl. No.: 13/260,939

(22) PCT Filed: Mar. 29, 2010

(86) PCT No.: PCT/EP2010/001964
§ 371 (c)(1),
(2), (4) Date: Sep. 29, 2011

(87) PCT Pub. No.: WO2010/112186
PCT Pub. Date: Oct. 7, 2010

(65) Prior Publication Data
US 2012/0025810 A1   Feb. 2, 2012

(30) Foreign Application Priority Data

Apr. 1, 2009 (DE) .................. 10 2009 015 883

(51) Int. Cl.
*G01B 7/14* (2006.01)
*G01B 7/30* (2006.01)
*G01R 33/06* (2006.01)
*H01L 43/06* (2006.01)

(52) U.S. Cl.
USPC ................... 324/207.2; 74/469; 74/473.33

(58) Field of Classification Search
USPC ............ 324/207.2, 207.13, 310, 207.11, 324/207.12, 207.14–207.26; 74/469, 74/473.33
See application file for complete search history.

(56) References Cited

U.S. PATENT DOCUMENTS

| 6,550,351 | B1 | 4/2003 | O'Reilly et al. |
| 6,879,240 | B2 | 4/2005 | Kruse |
| 7,829,805 | B2 | 11/2010 | Ersoy et al. |
| 2004/0160220 | A1* | 8/2004 | Wendt ................ 324/207.21 |
| 2004/0162185 | A1* | 8/2004 | Giefer et al. ................ 477/101 |
| 2007/0040803 | A1 | 2/2007 | Dider et al. |

(Continued)

FOREIGN PATENT DOCUMENTS

| DE | 19749330 A1 | 5/1999 |
| DE | 102004056800 A1 | 6/2006 |

(Continued)

OTHER PUBLICATIONS

Janisch, J., *Was Sie schon immer Ueber Hallsensoren wissen wollten, Kleiner Effekt-Grosse Wirkung*, Elektronik Industry (Jul. 2006).

*Primary Examiner* — Huy Q Phan
*Assistant Examiner* — Giovanni Astacio-Oquendo
(74) *Attorney, Agent, or Firm* — Panitch Schwarze Belisario & Nadel LLP

(57) ABSTRACT

A device for detecting the position of a gear step selector lever (2') for selecting a gear setting of a motor vehicle has a signal transmitter (14) arranged at the gear step selector lever (2') and a signal receiver (16) arranged spaced apart from the signal transmitter (14). The relative position between signal transmitter (14) and signal receiver (16) varies for different gear steps which can be selected. The signal transmitter (14) may be a magnet and the signal receiver (16) may be a triaxial Hall sensor system, designed so as to detect the relative position in three dimensions. Where the gear step selector lever (2') has a ball joint (20), the signal transmitter (14) is arranged at one ball (22) of the ball joint (20). In this arrangement, a north-south-axis (18) of the magnet (14) does not run through a ball center (26). The invention further relates to a motor vehicle comprising a corresponding device.

15 Claims, 2 Drawing Sheets

(56) References Cited

U.S. PATENT DOCUMENTS

2008/0048654 A1* 2/2008 Takahashi et al. ....... 324/207.25
2008/0078604 A1* 4/2008 Ersoy et al. ................... 180/336

FOREIGN PATENT DOCUMENTS

| | | |
|---|---|---|
| DE | 202007000210 U1 | 3/2007 |
| DE | 102007026303 A1 * | 12/2008 |
| DE | 102007026303 A1 | 12/2008 |
| DE | 102008061336 A1 | 1/2010 |
| EP | 2112406 A1 | 10/2009 |
| JP | 2002-254952 A | 9/2002 |
| JP | 2004-522115 A | 7/2004 |
| JP | 2007-052791 A | 3/2007 |
| JP | 2007-203976 A | 8/2007 |
| KR | 102007008622 | 8/2007 |
| WO | WO-2010066215 A1 | 6/2010 |

* cited by examiner

DEVICE FOR DETECTING THE POSITION OF A GEAR STEP SELECTOR LEVER AND MOTOR VEHICLE EQUIPPED WITH SAME

CROSS-REFERENCE TO RELATED APPLICATIONS

This application is a national stage application (under 35 U.S.C. §371) of PCT/EP2010/001964, filed Mar. 29, 2010, which claims benefit of German application 10 2009 015 993.9, filed Apr. 1, 2009.

TECHNICAL FIELD AND STATE OF THE ART

The invention relates in a first aspect to a device to detect the position of a gearshift lever for selecting a gear or the gear setting of a motor vehicle. The device has a signal transmitter installed on the gearshift lever and a signal receiver installed at a distance from the signal transmitter, whereby the different position of the signal transmitter relative to the signal receiver in different gears can be detected. The invention also relates to a motor vehicle having such a device.

Devices of the above-mentioned type are known in the state of the art. Automatic transmissions as well as the semiautomatic manual transmissions of motor vehicles are typically actuated without a direct mechanical coupling between the gearshift lever and the transmission. In these so-called "shift-by-wire" systems, the position of the gearshift lever is detected and, on the basis of the actual position of the gearshift lever, the desired gear is ascertained, which is then set, for instance, by means of auxiliary motors in the transmission.

Examples of commonly employed sensor means for such actuation devices are light barriers that are associated with each shifting position of the gearshift lever in such a way that their beam paths are interrupted by the shifting lever itself or by the shadowing components that are coupled to the movement of the shifting lever. Dirt on the light barrier components as well as wear of the mechanical components that couple the movement of the shifting lever to the shadowing components can impair the function in such actuation devices and, in the worse-case scenario, cause complete loss of function.

Furthermore, systems consisting of signal transmitters and signal receivers are known in which the signal transmitter is arranged on the gearshift lever and the signal receiver is arranged at a distance from it, for example, in a gearshift lever housing.

A known device for this purpose is disclosed in German patent application DE 10 2004 056 800 A1 on a shifting device that has a holder, a gearshift lever pivotably mounted on the holder by means of a joint as well as a signal transmitter and an angle-measuring device equipped with two sensors, whereby the angle-measuring device is arranged in the joint and electrically connected to a control unit that is connected to a vehicle transmission.

A disadvantage here is that at least two sensors are required that are arranged at a distance from each other in order to detect the position of the gearshift lever.

German patent application DE 102 2006 044 404 A1 discloses a device for detecting the angular position of the gearshift lever in a motor vehicle, whereby two Hall sensors to detect the field direction of the magnetic field are likewise provided.

Moreover, German utility model DE 20 2007 000 210 U1 discloses an actuation device for a vehicle transmission, comprising a gearshift lever that can be pivoted around at least one first pivoting axis into at least two shifting positions and whereby at least one first rotation-angle sensor is provided in order to determine the angular position of the gearshift lever around the first pivoting axis. When it comes to more complex two-dimensional movement possibilities of the gearshift lever, two sensors are also needed here so that the position of the gearshift lever can be detected. Here, too, there is the drawback that, owing to the normally two-dimensional movements of the gearshift lever in actual practice, at least two sensors are necessary. The requisite wiring and computation resources are correspondingly higher in these devices.

The device disclosed in German patent application DE 10 2007 026 303 A1 for detecting and evaluating the gear selection in a motor vehicle having a gearshift lever, at least one magnet and at least one magnet sensor element that is suited to detect three spatial components of a magnetic field. The sensor can be configured as a Hall sensor.

SUMMARY OF THE INVENTION

Before this backdrop, an objective of the invention is to improve a device of the above-mentioned type to the effect that the position of a gearshift lever can be detected with a high degree of reliability and, at the same time, with little computation effort as well as with the use of a small amount of material.

A device according to the invention for detecting the position of a gearshift lever for selecting the gear setting of a motor vehicle has a signal transmitter arranged on the gearshift lever as well as a signal receiver arranged at a distance from the signal transmitter. The position of the signal transmitter relative to the signal receiver is different in the various selectable gears and can be detected by the signal transmitter and the signal receiver.

The term "gearshift lever" as set forth in the present invention should be understood to refer to any device that can be manually actuated and with which at least two different gears of the transmission of a motor vehicle can be selected. In this context, the type of transmission does not play a role for the invention. The transmission can be an automatic transmission or a semi-automatic transmission as well as a conventional manual transmission. A device according to the invention can serve, for example, to display the gear.

It is provided according to the invention that the signal receiver is configured so as to detect the relative position of the signal transmitter in three dimensions. Therefore, the invention makes it possible to completely detect the position of a vehicle gearshift lever with one single signal receiver. This eliminates the need for the use of two signal receivers and for the greater computation effort associated with it. The device according to the invention also facilitates the construction of a corresponding gearshift lever device since only one signal receiver needs to be positioned and not more.

The relative position of the signal transmitter with respect to the signal receiver in three dimensions can be ascertained in various ways. Thus, it is conceivable to record the three vector components between the signal receiver and the signal transmitter. Moreover, it can also be sufficient to detect two vector components as well as the value of the distance vector. A third possibility to determine the three dimensions consists of determining three angles of a sensor signal that reaches the signal receiver from the signal transmitter.

The evaluation of the signal and thus the determination of the position of the signal transmitter relative to the signal receiver do not have be carried out directly in the signal receiver.

Furthermore, it is provided that the signal transmitter is configured as a magnet and the signal receiver is configured as a triaxial Hall sensor system. According to a refinement, the triaxial Hall sensor system can be configured in such a way as to evaluate the direction and/or the value of magnetic field that is emitted by the magnet and that reaches the triaxial Hall sensor system. The triaxial Hall sensor system is preferably configured as a so-called 3D-Hall sensor.

As a rule, the evaluation of the direction vector of the magnetic field of the triaxial Hall sensor system will be sufficient since the gearshift lever is normally installed in a shifting gate and can thus assume defined positions that are characterized by a characteristic magnetic field of the magnet in the triaxial Hall sensor system.

The energy supply for the signal receiver as well as the pick-up of the signal are facilitated if the signal receiver is also arranged in a fixed position in the vehicle. The signal receiver can be arranged, for example, in a housing of the gearshift lever.

According to another refinement of the invention, the signal transmitter is arranged on a support frame. The support frame serves to support and guide the vehicle gearshift lever, for example, inside the shifting gate. The gearshift lever is thus, for instance, cardanically suspended like a gimbal. Here, the arrangement of the signal transmitter on a support frame means that the signal transmitter can be arranged in the vicinity of a suspension of the support frame, as a result of which the distance between the signal transmitter and the signal receiver can be smaller and the signal receiver will require a lower level of sensitivity. This increases the evaluation reliability.

An especially preferred arrangement of the signal transmitter is on a first pivoting axis of the vehicle gearshift lever, and this is provided by the support frame. The arrangement of the signal transmitter on the pivoting axis allows the signal transmitter and the signal receiver to be arranged especially close to each other.

The pivoting axis around which the gearshift lever can be pivoted relative to the support frame is preferably used for this purpose. In this manner, when a gear is being selected, the signal transmitter is rotated and pivoted along relative to the housing around a second pivoting axis around which the support frame itself is pivoted. Thus, when the vehicle gearshift lever is actuated, greater signal changes are achieved in the signal receiver than in the case of other arrangements.

As an alternative to this, it can be provided that the signal transmitter is arranged on a side of the support frame that does not run through the second pivoting axis of the support frame described above, around which the support frame itself is pivoted relative to the vehicle. This, too, makes it possible to achieve large signal changes when different gears are selected.

If a magnet is employed as the signal transmitter in the above-mentioned suspension of the gearshift lever in a support frame, the determination of the position can be further improved in that the north-south axis of the magnet is oriented essentially perpendicular to the first pivoting axis. Then, pivoting of the gearshift lever causes a pivoting of the north-south axis of the magnet relative to the signal transmitter and thus a very large change of the signal.

According to an embodiment of the invention, the vehicle gearshift lever is provided with a ball-and-socket joint guidance, whereby the signal transmitter is then preferably arranged on the ball of the ball-and-socket joint. When the vehicle gearshift lever is pivoted around the ball-and-socket joint, the signal transmitter is pivoted together with the vehicle gearshift lever. The arrangement on the ball of the ball-and-socket joint allows a very uncomplicated arrangement of the signal receiver.

Another advantage can be obtained with a ball-and-socket joint guidance if a north-south axis of the magnet does not run towards or through a mid-point of the ball when a magnet is used as the signal transmitter. In this manner, a greater change of the magnetic field in the triaxial Hall sensor can be achieved, thus improving the evaluation precision.

Another advantage is attained when the signal transmitter is arranged inside a spherical surface formed by the radius of the ball of the ball-and-socket joint. As a result, a better guidance of the gearshift lever is achieved than with other arrangements of the signal transmitter, for example, on the spherical surface of the ball of the ball-and-socket joint or even outside of the spherical surface of the ball-and-socket joint. This does not detrimentally affect the guidance of the gearshift lever in a ball socket.

Preferably, the signal transmitter is arranged in the interior of the ball. This can be achieved, for example, by means of an injection-molded ball into which the signal transmitter was inserted during the injection molding, or else by using a hollow or partially hollow ball in whose interior the signal transmitter is located.

As an alternative to this, it can be provided that the ball has a spherical section in which the signal transmitter is located. Consequently, the ball is not a complete ball, but rather has a recess in which the signal transmitter is arranged. The recess can be so large that the signal transmitter complements the spherical surface or, alternatively, it can be cut open even further.

Preference is also given to an evaluation unit that is in communication with the signal transmitter in order to evaluate the signal of the signal receiver. This facilitates the evaluation of the sensor signal.

A first independent subject matter of the invention relates to a vehicle having a device according to the invention described above.

Additional objectives, features and advantageous application possibilities of the present invention ensue from the description below of embodiments with reference to the drawings. In this context, all of the described and/or depicted features, either on their own or in any meaningful combination, constitute the subject matter of the present invention, also irrespective of their compilation in the claims to which they refer back.

BRIEF DESCRIPTION OF THE DRAWINGS

The invention will be explained on the basis of two embodiments. The following is schematically shown.

DETAILED DESCRIPTION OF EMBODIMENTS

Figure 1:
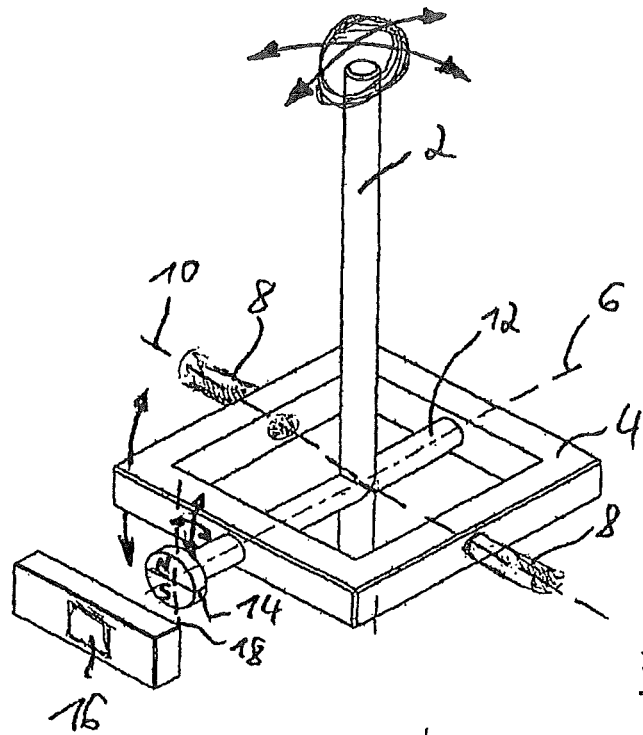
FIG. 1 a shifting lever with a device according to a first embodiment of the invention, in a perspective view.

Two different embodiments of the invention will be described below. For the sake of clarity, components that are identical or that have the same function are designated by the same reference numerals in both embodiments.

FIG. 1 shows a schematic three-dimensional view of a gear shifting device having a device according to a first embodiment of the invention for detecting the position of a gearshift lever 2.

The gearshift lever 2 is installed in a shifting gate (not shown here) and it allows different gears to be selected, which are arranged in the shifting gate in two dimensions, for instance, in a conventional H-arrangement of the various gears. The shifting gate can also provide, for example, for a sequential arrangement of the various gears and can have a second gearshift or shift track.

The gearshift lever 2 is mounted so as to be pivotable in two directions in a support frame 4. A first pivoting axis 6 is defined by a pivoting of the gearshift lever 2 relative to the support frame 4. A second pivoting axis 10 is provided by mounting the support frame 4 by means of bearing bolts 8 in a housing (not shown here) of the gearshift arrangement.

In order to pivot the gearshift lever 2 around the first pivoting axis 6, a pivoting shaft 12 that is rotatably mounted in the support frame 4 is provided in the interior of the support frame 4. The pivoting shaft 12 passes through the support frame 4 on the visible front of the support frame 4.

A magnet 14 is affixed onto one face of the bearing shaft 2. Opposite from the magnet 14, there is a Hall sensor 16 that allows a three-dimensional measurement of the magnetic field of the magnet 14. This is a 3D-Hall sensor.

A north-south axis 18 of the magnet 14 is oriented pairwise perpendicular to the pivoting axes 6, 10. A movement of the gearshift lever 2 in order to select a driving gear requires a pivoting of the gearshift lever 2 around at least one of the two pivoting axes 6, 10. Due to the coupling between the magnet 14 and the pivoting axis 12, when the gearshift lever 2 is pivoted around the first pivoting axis 6, the magnet 14 is rotated relative to the Hall sensor. The magnetic field originating from the magnet 14 turns together with the magnet 14, and the Hall sensor 16 registers this change in the magnetic field.

The measurement can be carried out statically or dynamically. A dynamic measurement, in other words, a measurement of the change in the magnetic field over the course of time, allows a causality examination and thus an improvement in the reliability of the position determination.

When the gearshift lever 2 pivots around the second pivoting axis 10, the distance between the magnet 14 and the Hall sensor 16 changes. This has an effect, on the one hand, on the absolute strength of the magnetic field of the magnet 14 in the area of the Hall sensor 16 and, to a lesser extent, an influence on the direction vector of the magnetic field of the magnet 14 in the area of the Hall sensor 16.

In the case of more complex movements of the gearshift lever 2, the latter pivots around the pivoting axis 6 as well as around the second pivoting axis 10. As a result, the magnetic field of the magnet 14 is rotated relative to the Hall sensor 16 and thus weakened. The position of the gearshift lever 2 can be clearly ascertained from the direction as well as of the strength of the magnetic field.

As an alternative to determining the strength of the magnetic field and of two components of the direction vector, it is also possible to measure all three components of the direction vector of the magnetic field of the magnet 14 in the area of the Hall sensor 16, thereby dispensing with the need to measure the strength of the magnetic field of the magnet 14.

Figure 2:
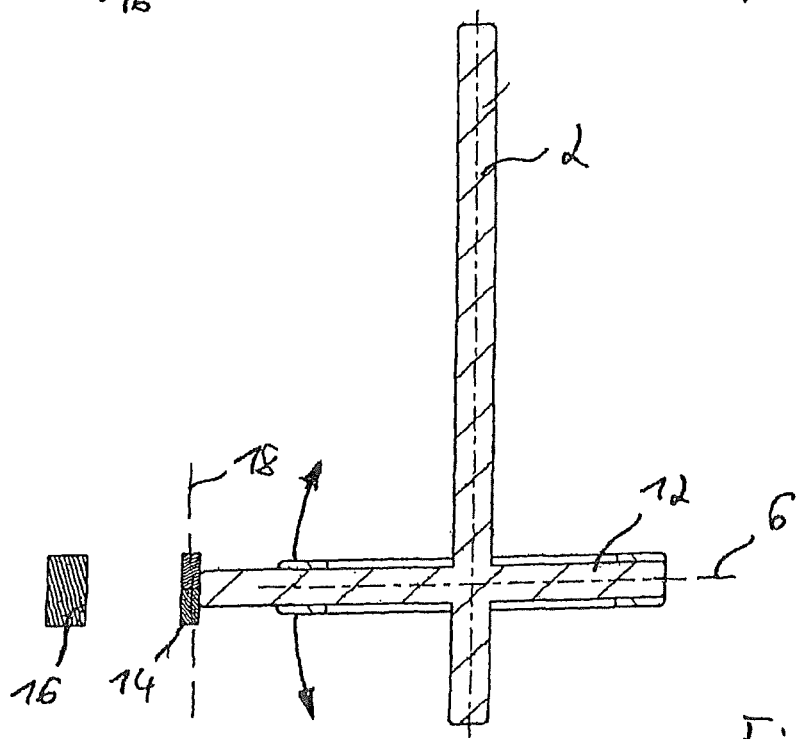
FIG. 2 a sectional view of a section along the sectional line A-A through the device from FIG. 1.

FIG. 2 shows a section through the arrangement according to FIG. 1, whereby the section is arranged perpendicular to the second pivoting axis 10 at the height of the first pivoting axis 6. Pivoting the gearshift lever 2 around the second pivoting axis 10 causes the magnet 14 to considerably increase its distance from the Hall sensor 16.

Figure 3:
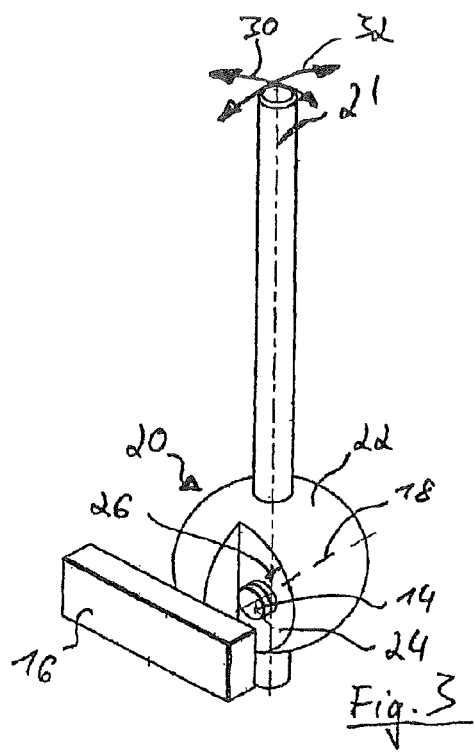
FIG. 3 a vehicle gearshift lever with a device according to a second embodiment of the invention, in a perspective view.

FIGS. 3 to 6 show a second embodiment of the invention. FIG. 3 shows a schematic perspective view of a gearshift arrangement comprising a gearshift lever T that is guided by a ball-and-socket joint 20. The ball-and-socket joint 20 has a ball 22 that is pivotably mounted in a ball socket (not shown here).

A magnet 14 is arranged in a ball recess 24, whereby a north-south axis 18 of the magnet 14 is oriented in such a way that it does not run through a mid-point 26 of the ball 22. Adjacent to the magnet 14, there is a Hall sensor 16 that is permanently installed in a housing of the gearshift arrangement, whereby the Hall sensor 16 is configured to detect the three-dimensional position of the magnet 14 relative to the Hall sensor 16, as was the case with the previously described embodiment. The above-mentioned techniques for measuring the relative position of the gearshift lever 2' can also be employed in the second embodiment.

Figure 4:
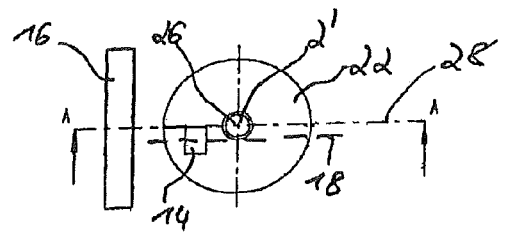
FIG. 4 a top view of the device from FIG. 3.

Arranging the magnet 14 in such a way that its north-south axis 18 does not pass through the mid-point of the ball 22 makes it possible, for example, as shown in FIG. 4, for the magnet 14 to run eccentrically with respect to an axis 28 that runs through the mid-point of the ball 22, but with the north-south axis 18 parallel to the axis 28. In the second embodiment, the axis 28 is positioned in such a way that it involves the shortest connection between the ball 22 and the Hall sensor 16.

Figure 5:
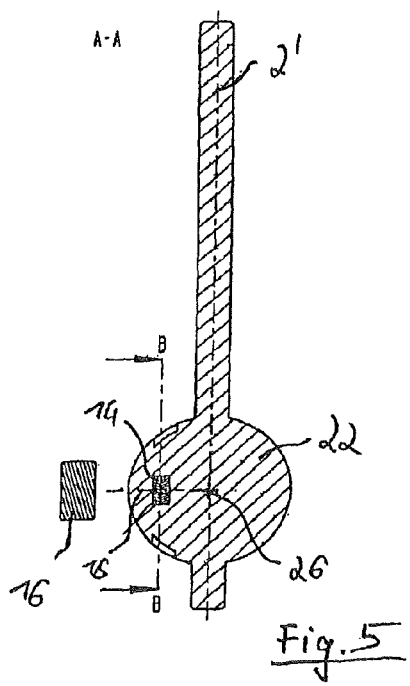
FIG. 5 a section through a vehicle gearshift lever according to the second embodiment, along the sectional line A-A in accordance with FIG. 4.
Figure 6:
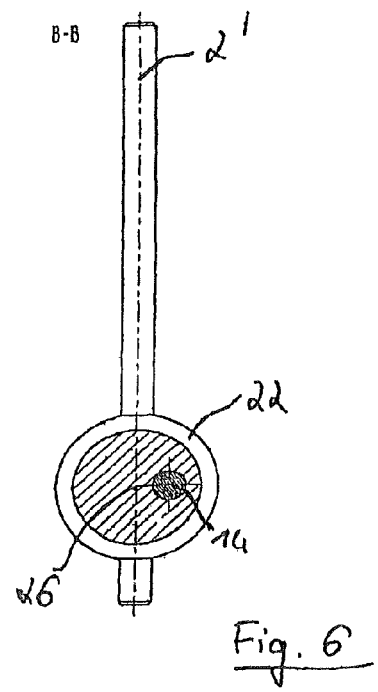
FIG. 6 a section through a vehicle gearshift lever according to the second embodiment of the invention, along the sectional line B-B from FIG. 5.

The arrangement of the magnet 14 in the ball is illustrated in greater detail in FIGS. 5 and 6, each of which shows a section along the sectional lines A-A from FIG. 4 (FIG. 5) and B-B from FIG. 5 (FIG. 6).

The eccentric arrangement of the magnet 14 means that the magnet 14 travels with a larger stroke when the gearshift lever 2' is moved relative to the Hall sensor 16. When the gearshift lever 2' is moved in a first direction 30, the magnet 14 is moved on an orbit around the Hall sensor 16. A movement of the gearshift lever 2' around a second pivoting direction 32 leads to a change in the relative distance between the magnet 14 and the Hall sensor 16 as well as to a tilting of the north-south axis 18 of the magnet 14 relative to the Hall sensor 16.

The second embodiment also allows different ways of measuring the relative position between the magnet 14 and the Hall sensor 16 since the strength of the magnetic field of the magnet 14 in the area of the Hall sensor 16 as well as the direction of the magnetic field vector of the magnetic field change during the pivoting.

While preferred embodiments of the invention have been described and illustrated here, various changes, substitutions and modifications to the described embodiments will become apparent to those of ordinary skill in the art without thereby departing from the scope and spirit of the invention.

LIST OF REFERENCE NUMERALS 2, 2' gearshift lever
4 support frame
6 first pivoting axis
8 support bolt
10 second pivoting axis
12 pivoting shaft
14 signal transmitter, magnet
16 Hall sensor
18 north-south axis
20 ball-and-socket joint
22 ball 24 ball recess
26 mid-point of ball
28 axis
30 pivoting direction
32 pivoting direction

The invention claimed is:

1. A device to detect the position of a gearshift lever (2, 2') for selecting a gear setting of a motor vehicle in which the gearshift lever (2, 2') has a ball-and-socket joint (20), in which a signal transmitter (14) comprises a magnet that is installed on the gearshift lever (2, 2') by arrangement on or in a ball (22) of the ball-and-socket joint (20) with said magnet defining a north-south axis (18) and a magnet mid-point, and a signal receiver (16) comprises a triaxial Hall sensor system that is installed at a distance from the signal transmitter (14), and in which the position of the signal transmitter (14) relative to the signal receiver (16) is different in various selectable gear settings, characterized in that the north-south axis (18) of the magnet (14) does not run through a mid-point (26) of the ball, and the magnet (14) is arranged eccentrically with respect to an axis (28) defined by a shortest distance between the ball (22) and the Hall sensor (16) and running through the mid-point of the ball (22).

2. The device according to claim 1, characterized in that the signal receiver (16) is arranged in a fixed position in the motor vehicle.

3. The device according to claim 1, characterized in that the signal transmitter (14) is arranged inside a spherical surface formed by the radius of the ball (22).

4. The device according to claim 3, characterized in that the ball (22) has a section (24) in which the signal transmitter (14) is located.

5. The device according to claim 1, characterized in that the signal transmitter (14) is arranged in the interior of the ball (22).

6. The device according to claim 1, further comprising an evaluation unit (28) that is in communication with the signal transmitter (14) in order to evaluate signal(s) of the signal receiver (16).

7. The device according to claim 1, characterized in that the north-south axis (18) is arranged parallel to the axis (28).

8. A motor vehicle, comprising:
a device to detect the position of a gearshift lever for selecting a gear setting of the motor vehicle in which the gearshift lever has a ball-and-socket joint, comprising
a signal transmitter having a magnet that is installed on the gearshift lever by arrangement on or in a ball of the ball-and-socket joint with said magnet defining a north-south axis and a magnet mid-point, and
a signal receiver that comprises a triaxial Hall sensor system that is installed at a distance from the signal transmitter, and in which the position of the signal transmitter relative to the signal receiver is different in various selectable gear settings,
wherein the north-south axis of the magnet does not run through a mid-point of the ball, and the magnet is arranged eccentrically with respect to an axis defined by a shortest distance between the ball and the Hall sensor and running through the mid-point of the ball.

9. The motor vehicle of claim 8, wherein the signal receiver (16) is arranged in a fixed position in the motor vehicle.

10. The motor vehicle of claim 8, further comprising an evaluation unit (28) that is in communication with the signal transmitter (14) in order to evaluate signal(s) of the signal receiver (16).

11. The motor vehicle of claim 8, wherein the north-south axis that does not run through the mid-point of said ball is arranged parallel to the axis running through the mid-point of said ball.

12. A device to detect the position of a gearshift lever for selecting a gear setting of a motor vehicle, comprising:
a signal transmitter comprising a magnet that is installed on or in a ball of a ball-and-socket joint forming the gearshift lever, said magnet defining a north-south axis and a magnet mid-point, and said ball defining a mid-point,
a signal receiver comprising a triaxial Hall sensor system that is installed at a distance from the signal transmitter, and in which the position of the signal transmitter relative to the signal receiver is different in the various selectable gear settings,
wherein the north-south axis of the magnet does not run through the mid-point of the ball, and the magnet is arranged eccentrically with respect to an axis defined by a shortest distance between the ball and the Hall sensor and running through the mid-point of the ball.

13. The device of claim 12, wherein the magnet is arranged inside a spherical surface formed by the radius of the ball.

14. The device of claim 12, wherein the north-south axis that does not run through the mid-point of said ball is arranged parallel to the axis running through the mid-point of said ball.

15. The device of claim 12, further comprising an evaluation unit that is in communication with the signal transmitter in order to evaluate signal(s) of the signal receiver.

* * * * *